J. W. IVORY.
RUBBER DAM CLAMP.
APPLICATION FILED OCT. 19, 1914.
1,159,496. Patented Nov. 9, 1915.
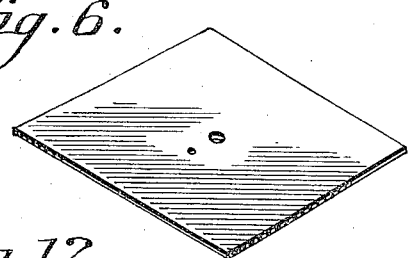
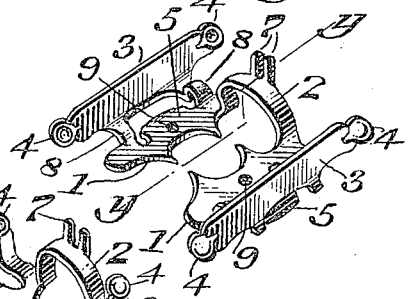
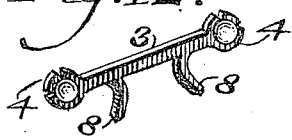
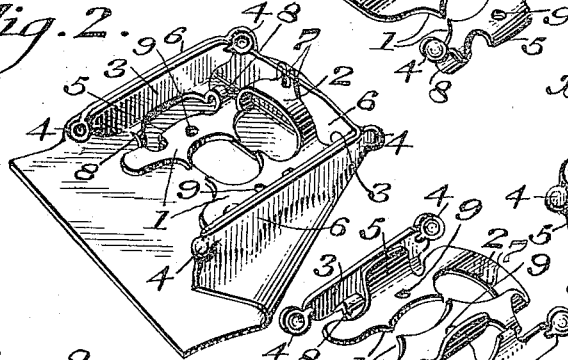
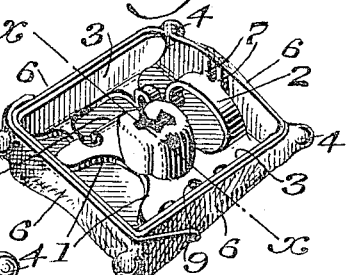
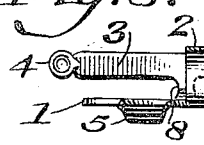
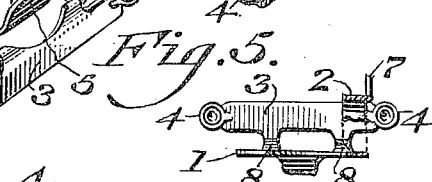
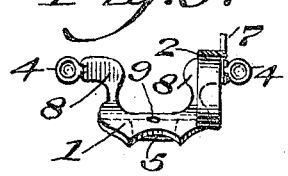
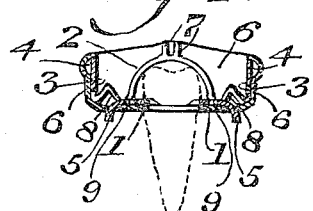
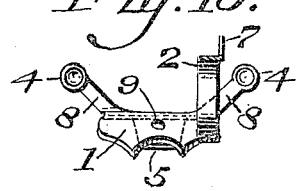
WITNESSES
D. F. Nagle
H. G. Dieterich
INVENTOR
James W. Ivory
BY Wiedersheim + Fairbanks
ATTORNEYS

UNITED STATES PATENT OFFICE.

JAMES W. IVORY, OF PHILADELPHIA, PENNSYLVANIA.

RUBBER-DAM CLAMP.

1,159,496. Specification of Letters Patent. Patented Nov. 9, 1915.

Application filed October 19, 1914. Serial No. 867,312.

*To all whom it may concern:*

Be it known that I, JAMES W. IVORY, a subject of the King of Great Britain, residing in the city and county of Philadelphia, State of Pennsylvania, have invented a new and useful Rubber-Dam Clamp, of which the following is a specification.

My invention relates to a rubber dam clamp wherein provision is made for forming a wall around a tooth on which an operation is to be performed, whereby the tooth and adjacent portions of the gum are effectively isolated from its surroundings.

It consists also of details of construction as will be hereinafter set forth.

The invention is satisfactorily illustrated in the accompanying drawing, but the important instrumentalities thereof may be varied, and so it is to be understood that the invention is not limited to the specific details shown and described so long as it is within the scope of the claims.

Figure 1 represents a perspective view of a rubber dam clamp embodying my invention. Fig. 2 represents a similar view showing a rubber dam partly in position on the clamp. Fig. 3 represents a similar view showing said dam fully in position thereon. Fig. 4 represents a section on line $x$—$x$, Fig. 3. Fig. 5 represents a section on line $y$—$y$ Fig. 1. Fig. 6 represents a perspective view of a rubber dam employed. Fig. 7 represents a perspective view of another form of the invention. Figs. 8, 9 and 10 represent sections of other forms of the invention. Fig. 11 represents a bottom plan view of Fig. 1. Figs. 12 and 13 represent views of portions of modifications.

Similar numerals of reference indicate corresponding parts in the figures.

Referring to the drawings, 1 designates the jaws of the clamp, and 2 designates the resilient bridge connecting the same, said members *per se* being known in the art. Supported on said jaws 1 and extending outwardly from the sides thereof are the bars 3, the terminals of which have cup-like projections 4 thereon, which thus occupy positions comparatively at the several corners of the clamp. On what may be termed the underside of the clamp are the wings 5 which project vertically from the jaws and are adapted to have a rubber dam primarily attached thereto, said dam being shown in Fig. 6, as having a number of openings punched therein, the same being adapted for attaching purposes, as will be hereinafter described.

The operation is as follows:—The dam is stretched over the wings 5 and the corner projections 4. Forceps is engaged in the openings 9 in the jaw, and the clamp is spread by the same and carried over the tooth, the dam at its opening between the jaws also passing over the tooth. The dam is now stripped from said wings when it contracts and closes around the neck of the tooth and the surrounding portions thereof are raised and folded on the projections 4 forming a wall or inclosure for the tooth which effectively prevents saliva from flowing around the same, this being the object of the dam.

In order to prevent the wall 6 from slipping from the bridge 2, the latter is provided with the lug 7 which projects vertically upwardly or downwardly as the case may be from the crown of said bridge and on whose outer ends the relative portion of the dam may be stretched and thus supported against displacement at said bridge.

Attention is drawn to the fact that the jaws 1, the bridge 2, the bars 3, the wings 5 and the lugs 7 are formed integral of suitable sheet metal, preferably steel, which is properly cut and formed into shape, thus avoiding joints at the places of said parts one with the other, and rendering the clamp strong, and durable in its nature, and produced at less expense than heretofore.

In Figs. 1, 2, 3, 4, and 5, the side bars 3 are connected with the jaws 1 by the pair of necks 8, and so are firmly sustained in position, said necks being integral with said jaws and bars, and somewhat resilient in their nature. In Figs. 7, 9 and 10, said bars are dispensed with, and the corner projections 4 are connected directly with the necks 8, the several necks being of different contours and angularities. In Fig. 8, the bar 3 is shown supported by a single neck on the adjacent jaw without, however, producing different results from the constructions in the other figures.

Attention is drawn to the fact that the projections 4 are cup-shape or concavo-convex at opposite faces whereby their outer faces which are convex, present smooth rounded surfaces to the cheek and tongue, the effect of which is evident, attention being directed also to said projections that they may be readily struck-up into shape, and may be formed integral with the bars 3, as a preferred form, although in some instances they may be produced separately from said bars and connected therewith in any suitable manner.

In Fig. 13 I show an attachment on the bridge in lieu of the lugs 7, the same being of the form of a cup, the edge of which is cut-away or nicked, roughened or otherwise serrated forming edges with which the contiguous portion of the rubber dam may be engaged and connected for a purpose similar to said limb, the same being true of the cups 4 which may be similarly cut-away, serrated or nicked, as shown plainly in Fig. 12.

In the manufacture of the clamp the bow is looped-up from a portion of the blanked out metal the jaw part of the blank being left flat, this differing from the ordinary design of rubber dam clamps where the bow curves around in the form of a band, the jaw necessarily curving with the bow.

This clamp could not be made from a blanking form the way that ordinary clamps are blanked-out, as the material for the arms could not come from the metal sheet within the length of the bow, but by having the jaw formed within the confines of the length of the bow and the jaws facing inwardly, and the bridge or bow looped enough to bring the jaws together, there is room in the metal sheet to produce the bow and extensions to form the entire clamp of integral metal or material.

Having thus described my invention what I claim as new and desire to secure by Letters Patent, is:—

1. A rubber dam clamp composed of jaws, a resilient bridge connecting the same, and arms on said jaws extending vertically therefrom and having cupped projections thereon, bridge and jaws being of integral construction.

2. A rubber dam clamp composed of jaws, a resilient bridge connecting the same, arms on said clamp extending laterally therefrom in the direction of said clamps, and projections on the terminals of said arms, said projection being of cup like form.

3. In a rubber dam clamp, the jaws thereof having thereon wings which project laterally in opposite direction for primary attachment thereto of a dam on what may be termed the underside of the clamp and arms extending vertically from said jaws.

4. A rubber dam clamp composed of jaws, a resilient bridge connecting the same, wings on said jaws on what may be termed the underside of the clamp adapted for the attachment thereto of the dam to occupy a position primarily on the sides of a tooth and arms extending vertically from said jaws.

5. A rubber dam clamp composed of jaws, a resilient bridge connecting the same, and a lug on said bridge projecting therefrom in the vertical direction of the clamp.

6. A rubber dam clamp composed of jaws, a resilient bridge connecting the same, arms on said clamps extending laterally therefrom on the line of the same, a lug on the crown of said bridge projecting therefrom in the vertical direction of the clamp, and projections on the terminals of said arms corresponding to the corners of the clamp, said lug, bridge, jaws and arms being of integral construction and jointless.

7. A rubber dam clamp composed of jaws, and a resilient bridge connecting the same, said bridge joining the inner sides of said jaws, and the working faces of said jaws being within the confines of the length of said bridge.

8. In a rubber dam clamp, projections rising from the jaws thereof, the same being of cup-like form, and means for supporting the same on said jaws.

9. In a rubber dam clamp, projections rising from the jaws thereof, the same being of cup-like form, and means for supporting the same on said jaws, the edges of said projections being serrated.

JAMES W. IVORY.

Witnesses:
 JOHN A. WIEDERSHEIM,
 N. BUSSINGER.

Copies of this patent may be obtained for five cents each, by addressing the "Commissioner of Patents, Washington, D. C."